April 28, 1953     A. J. SCHWARTZ ET AL     2,636,473
WATER PURIFYING DEVICE FOR AQUARIUMS
Filed Nov. 17, 1951
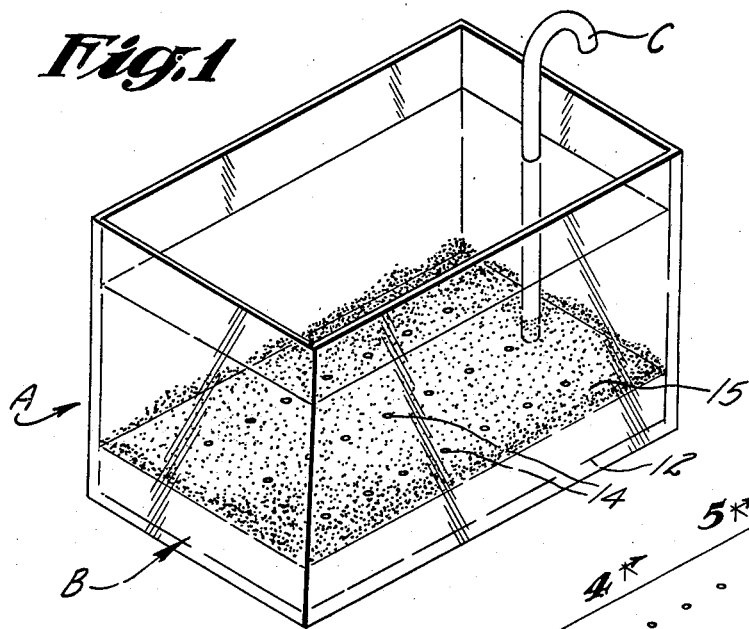
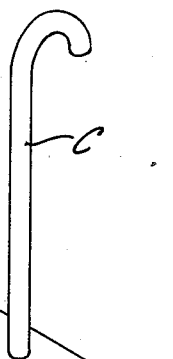
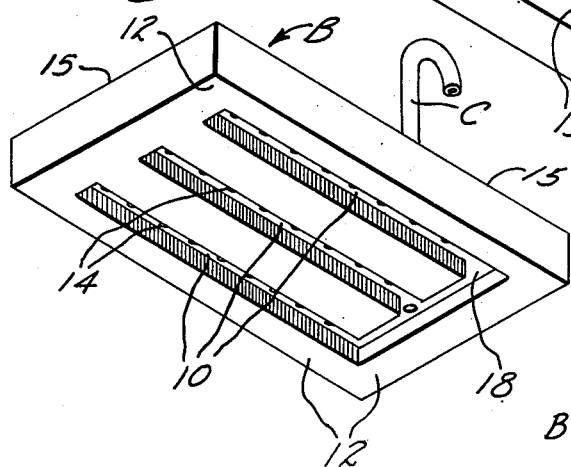
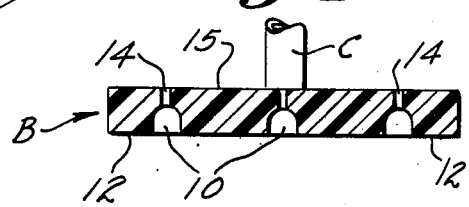
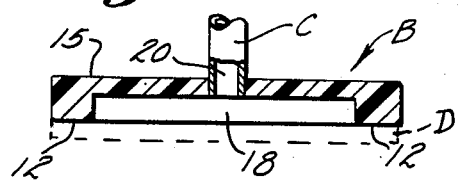
INVENTORS
Albert J. Schwartz
BY Samuel H. Barbour
Harry Langsam
Attorney Patented Apr. 28, 1953

2,636,473

UNITED STATES PATENT OFFICE 2,636,473

WATER PURIFYING DEVICE FOR AQUARIUMS

Albert J. Schwartz and Samuel H. Barbour, Philadelphia, Pa.

Application November 17, 1951, Serial No. 256,882

3 Claims. (Cl. 119—5)

1

Our invention relates to an aquarium and relates particularly to an aquarium of the type wherein small fish are reared, displayed, and exhibited.

Heretofore, small fish, of the type which amateur naturalists raise at home, have been placed in transparent tanks or aquariums where the water is aerated as well as heated.

It has been found that the fish droppings and their waste material, such as food particles normally settle upon the sand at the bottom of the aquarium and decompose, causing the sand to turn black and to become foul. The result of the decomposition of the waste material and the droppings has a deleterious effect upon the fish as they slowly die, thereby resulting in a loss of desirable fish.

It is an object of our invention to provide a waste removal plate for an aquarium wherein the water need not be changed and where the frequent perishing of fish is avoided.

Another object of our invention is to provide an aquarium wherein an effective treatment for external fish diseases such as ichlhyophthirius is established.

Another object of our invention is to provide an aquarium wherein the continued and unimpaired operation of the aquarium need not be suspended for purposes of cleaning the aquarium.

Another object of our invention is to provide, in a fish aquarium, a purifying device wherein impurities such as decayed rests of food or other waste material which has been deposited in any inaccessible area, may be withdrawn automatically from the water in the tank thereby preventing the pollution of the water and conserving the life of the fish in the aquarium.

Another object of our invention is to provide an aquarium in which the water will be automatically refreshed.

Another object of our invention is to provide in an aquarium, a unit wherein particles are comminuted.

With the above and related objects in view, our invention consists in the details of construction and combination of parts, as will be more fully understood from the following description, when read in conjunction with the accompanying drawings, in which:

Fig. 1 is a perspective view of an aquarium embodying our plate invention therein.

Fig. 2 is a perspective view of the plate which is an embodiment of our invention.

Fig. 3 is a perspective view of the bottom of the plate.

2

Fig. 4 is a sectional view taken along the line 4—4 of Fig. 2.

Fig. 5 is a sectional view taken along the line 5—5 of Fig. 3.

Referring now in greater detail to my invention, we show an aquarium or tank, generally designated as A, wherein fish of various types and other aquatic animals may be housed.

We provide a plate, generally designated as B, which covers the entire bottom of an aquarium. The plate B has an upper surface 15 and a bottom surface 12. The bottom surface 12 has a plurality of communicating channels or recesses 10 therein. The bottom surface is in contact with the bottom of the aquarium so that debris or dirt accumulated on the bottom of the aquarium will not clog the communicating channels 10.

The plate B is made of plastic material and it covers the entire bottom surface of the tank with the sand located above the plate so that the plate is beneath the level of all the contents of the tank.

A plurality of fine holes or openings 14 drilled completely through the channel 10 to the upper surface 15 of the plate permits water to be drawn therethrough. The fine holes 14 serve as a comminuting member to break up particles or granules sucked therethrough. The channels 10 are joined together by a common cross channel.

A syphon tube, generally designated as C, is mounted at right angles to the plate B. The syphon tube C has an opening 20 into the common channel 18 and it syphons water from the bottom of the plate B into a standard filter (not shown) where the water will be cleaned and returned to the tank of water or aquarium.

In the prior art, the fish droppings and other waste materials such as food, normally settle into the sand and decompose, thereby causing the sand to turn black and foul. With our invention the droppings or other waste material are drawn through the fine holes 14 in the plate B by the syphon action thereby resulting in a circulatory motion of the entire water within the tank. These particles (droppings or other waste material) are drained from the sand through the syphon tube into a filter (not shown) where the droppings and waste material are removed from the water and the water is returned to the tank as clear water.

The plate B enables the water to be drained and the particles comminuted therethrough so that a minimum of stagnation results.

The small openings break the larger pieces of waste material without permitting the sand to be withdrawn from the aquarium.

The flooring of an aquarium may be built therein with the plate B either as an integral unit or as a portion firmly fixed to the bottom of the tank. In Fig. 5 we show in dotted lines a covering D which is tightly affixed to the plate B whereby a flooring for an aquarium is formed.

Although our invention has been described in considerable detail, such description is intended as being illustrative rather than limiting, since the invention may be variously embodied, and the scope of the invention is to be determined as claimed.

We claim as our invention:

1. For use in an aquarium a plate having a substantially flat top, a substantially flat bottom having a plurality of communicating channels therein, a plurality of fine openings leading from the top of said plate to said channels wherein particles are comminuted in their passage through said openings, and a syphon pipe connected to said communicating channels and extending through the top of said plate.

2. For use in an aquarium an integrally formed plate having a substantially flat top, a substantially flat bottom on said plate having a plurality of communicating channels therein, a plurality of fine openings leading from the top of said plate to said channels wherein particles are comminuted in their passage through said openings, and a syphon pipe bore connected to said communicating channels.

3. In combination with an aquarium a plate having a substantially flat top and covering the entire bottom of said aquarium, a substantially flat bottom having a plurality of communicating channels therein, a plurality of fine openings leading from the top of said plate to said channels wherein particles are comminuted in their passage through said openings, and a syphon pipe connected to said communicating channels and extending through the top of said plate.

ALBERT J. SCHWARTZ.
SAMUEL H. BARBOUR.

References Cited in the file of this patent

UNITED STATES PATENTS

| Number | Name | Date |
|---|---|---|
| 653,160 | Williamson | July 3, 1900 |
| 950,999 | Erlwein et al. | Mar. 1, 1910 |
| 2,491,853 | Feldman | Dec. 20, 1949 |
| 2,594,474 | McGrath | Apr. 29, 1952 |
| 2,595,965 | Ludwick | May 6, 1952 |